March 13, 1962  P. F. CARLOTTI  3,024,608
COMBUSTION DEVICES

Filed Sept. 14, 1959  6 Sheets-Sheet 1

INVENTOR
Pierre François Carlotti
BY
Watson, Cole, Grindle & Watson
ATTORNEYS

March 13, 1962  P. F. CARLOTTI  3,024,608
COMBUSTION DEVICES
Filed Sept. 14, 1959  6 Sheets-Sheet 5

INVENTOR
Pierre Francois Carlotti
By Watson, Cole, Grindle & Watson
ATTORNEYS

March 13, 1962

P. F. CARLOTTI 3,024,608

COMBUSTION DEVICES

Filed Sept. 14, 1959

INVENTOR
Pierre Francois Carlotti
BY Watson, Cole, Grindle & Watson
ATTORNEYS

United States Patent Office 3,024,608
Patented Mar. 13, 1962

3,024,608
COMBUSTION DEVICES
Pierre Francois Carlotti, Paris, France, assignor to Societe Nationale d'Etude et de Construction de Moteurs d'Aviation, Paris, France, a company of France
Filed Sept. 14, 1959, Ser. No. 839,875
Claims priority, application France Sept. 24, 1958
12 Claims. (Cl. 60—39.72)

The present invention relates to an improved burner which is particularly suitable for combustion chambers subjected to a gaseous flow travelling at a high speed, such as combustion chambers in ram-jet engines, or subjected to particular conditions of use such as combustion chambers or post-combustion chambers of turbo-jet engines, etc.

According to the invention, the combustion device is constituted by a chamber which is open towards the downstream side and closed towards the upstream side and into which fuel is injected and which is associated with an ejector adapted to aspirate from the upstream region of the chamber so that a flow is produced in the said chamber from the downstream towards the upstream side.

According to one feature of the invention, the ejector is shaped so that the flow at the throat is sonic, which is particularly advantageous in cases where the combustion device according to the invention is situated in a combustion chamber where the gaseous flow is travelling at a high Mach number, as in ram-jet engines for example.

Thus, the improved burner according to the invention has the property of operating in the same stability conditions irrespective of the speed of the main air flow outside the device. Since the supply of air to the combustion device is independent of the speed, ignition is possible at a high Mach number and the device can also act as a pilot flame for a main burner. The current of air supplying the sonic-throat ejector creates inside the chamber a flow of gas which maintains the flame upstream at the bottom of the chamber, irrespective of the speed of the air outside the device.

The following description with reference to the accompanying drawings, which are given by way of non-limitative example, will make it easy to understand the various features of the invention and the way in which they can be carried into effect, any feature brought out either from the text or from the figures being understood to come within the scope of the present invention.

Figure 1:
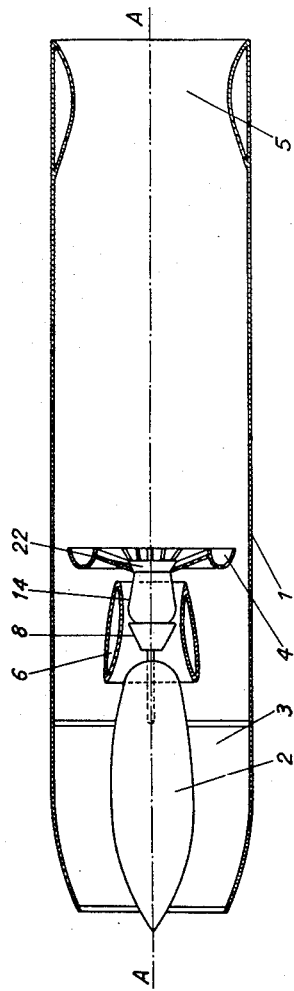
FIG. 1 is a diagrammatic longitudinal sectional view of a ram-jet engine equipped with a combustion device according to the invention associated with a main burner.

FIG. 1 shows diagrammatically a ram-jet engine whose axis is A—A and comprises an external cowling 1 with a central body 2 which can contain, inter alia, fuel, and whose wall forms a divergent channel 3 in cooperation with the external cowling 1. A combustion chamber with a main burner 4 is situated downstream of the central body 2. The ram-jet engine terminates in a convergent-divergent discharge nozzle 5. Situated between the central body 2 and the main burner 4 is a combustion device according to the invention which in this example is adapted to propagate the flame to the main burner 4.

Figure 2:
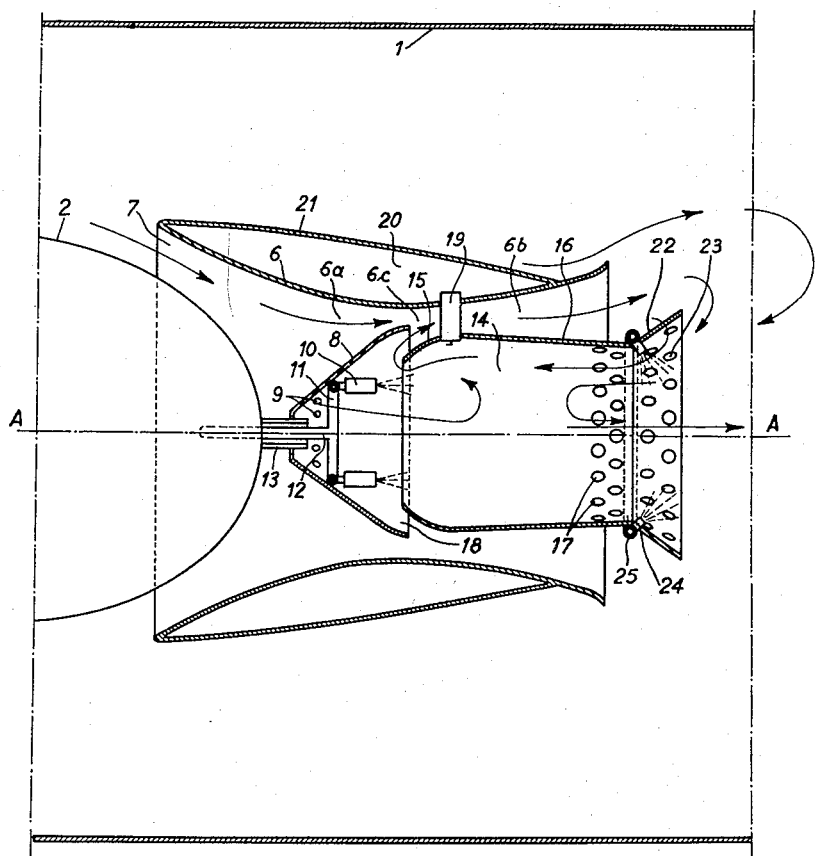
FIG. 2 is a sectional view on a larger scale of the improved burner according to the invention.

FIG. 2 shows in section and on a larger scale the device according to the invention, which comprises an external convergent-divergent nozzle 6 which is a body of revolution about the axis A—A. The air sweeps into the nozzle 6 through an annular inlet 7 comprised between the wall of the convergent portion of the nozzle 6 and the wall of the central body 2 of the ram-jet engine.

Situated within this ejector 6 is a cone 8 having A—A as its axis and whose apex is situated towards the upstream side and whose base is substantially in the plane of the throat of the nozzle 6. This cone is provided with a series of orifices 9 in the vicinity of its apex. Within the cone, fuel injectors 10 are carried by a distributing pipe 11 connected by a pipe 12 to a fuel tank situated, for example, in the central body 2 of the ram-jet engine. This cone 8 can be displaced longitudinally by an appropriate means, for example by sliding on slideways 13 surrounding the pipe 12.

A chamber 14, which is a body of revolution about the axis A—A, is situated downstream of the cone 8. It is constituted by a divergent wall 15 which is continued in a convergent wall 16 perforated in the vicinity of its downstream end with one or more series of orifices 17. The divergent wall 15 of the chamber 14 forms with the wall of the cone 8 an annular slot 18. In the chamber 14, an ignition device, for example a sparking plug 19, is connected to an electric circuit arranged in an annular space 20 existing between the wall of the nozzle 6 and an external wall 21.

Thus, the wall 6 forms with the wall of the cone 8, and then with the wall 16 of the chamber 14, an annular duct which is convergent at 6a and divergent at 6b and whose throat 6c is level with the slot 18.

A conical outlet wall 22 provided with orifices 23 is connected to the downstream edge of the convergent wall 16 of the chamber 14. Downstream injection, at the outlet of the chamber 14, is provided by means of injectors 24 carried by a distributing pipe 25 and directed downstream obliquely with respect to the axis A—A.

The device operates in the following manner: the air sweeps in through the annular inlet 7 and passes into the convergent-divergent annular ejector situated between the wall 6 and the walls 8 and 16. The flow quantity of air depends on the outlet or adaptation cross-section of the divergent duct 6b until a sonic condition is established at the throat 6c. For this purpose, the downstream edge of the divergent wall 6 is slightly flared so as to obtain a greater aerodynamic adaptation cross-section, which permits achieving the sonic state at the throat more rapidly and with a shorter assembly. The passage through the throat is thus followed simply by a re-compression in the divergent portion 6b. In this case, the flow quantity of air travelling through the ejector is constant irrespective of the air speed outside the device and therefore irrespective of the speed of the aircraft carrying the ram-jet engine, provided, however, that the temperature and the pressure remain constant.

An ejector effect is produced at the throat 6c and the mass of air which passes therethrough aspirates through the annular slot 18 a quantity of gas from within the chamber 14. This quantity of gas aspirated from the said chamber through the slot 18 is a mixture of fuel and fresh air coming from the duct 6b and which penetrates into the chamber 14 either directly through its conical outlet 22 or through the orifices 17 and 23. The flow of gases in the upstream direction in the chamber 14 is very slow, which permits secondary air to penetrate into the cone 8 through the orifices 9. These orifces 9 are so constructed that the secondary air passing therethrough increases the turbulence of the gases, thus promoting the mixture of air and fuel.

In order to obtain the best efficiency from this ejector device, the cross-section of the suction slot 18 is adjusted by displacing the cone 8 parallel to the axis A—A by means of the slideways 13. This adjustment is effected in dependence on the temperature and the pressure prevailing in the chamber 14.

Ignition is brought about by a sparking plug 19 in the chamber 14, which is supplied with fuel through the injectors 10. The suction through the annular slot which creates a flow of gases in the upstream direction through the chamber, maintains the flame at the base of the cone 8 irrespective of the speed of the air externally of the device. The downstream injection by means of the injectors 24 increases the volume and intensity of the flame. This increase in volume and intensity facilitates the propagation of the flame to the main burner 4 situated downstream of the conical outlet wall 22 (see FIG. 1).

Figure 3:
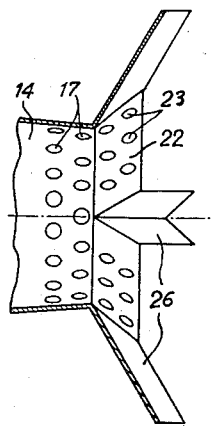
FIG. 3 shows a constructional detail permitting the burner according to the invention to be connected to a main burner.

The propagation of the flame to the main burner 4 is aided by extension pieces 26 uniformly arranged on the conical outlet wall 22 (FIG. 3). The extension pieces 26 inclined with respect to the axis A—A are constituted by two thin plates connected together at one side to form an angle piece whose apex is directed towards the upstream side.

Figure 4:
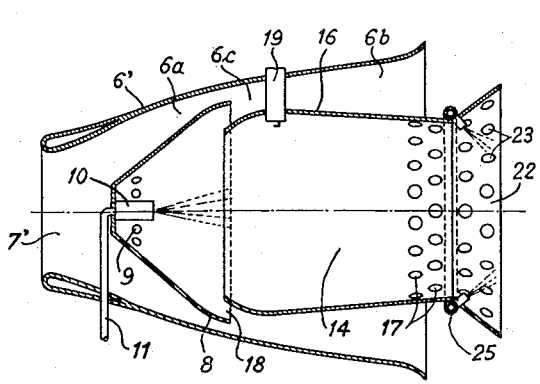
FIG. 4 is a variant of FIG. 2.

In the modified form shown in FIG. 4, where the elements corresponding to those used in FIG. 2 bear the same reference numerals, the air inlet instead of being annular is a circular aperture 7' bounded by the external wall 6'. This wall 6' is constructed so as to again form an ejector cooperating with the cone 8 to form a convergent duct 6a and with the wall of the chamber 14 to form a divergent duct 6b; the annular slot 18 being situated in the vicinity of the throat 6c of the ejector. The method of operation is the same as that in the form of embodiment according to FIG. 2.

Figure 5:
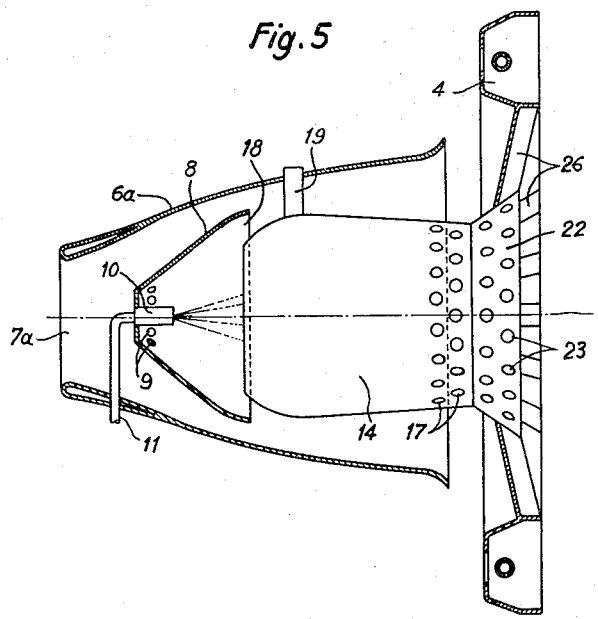
FIG. 5 illustrates the variant of FIG. 4 combined with a main burner.

FIG. 5 shows the device according to FIG 4 combined with a main annular burner 4 by means of extension pieces 26. The drawing shows an axial section through the device, except for the chamber 14 and the conical outlet part 22 which are shown in elevation. The device, which is a body of revolution about the axis A—A is particularly suitable for a ram-jet engine of small diameter.

Figure 6:
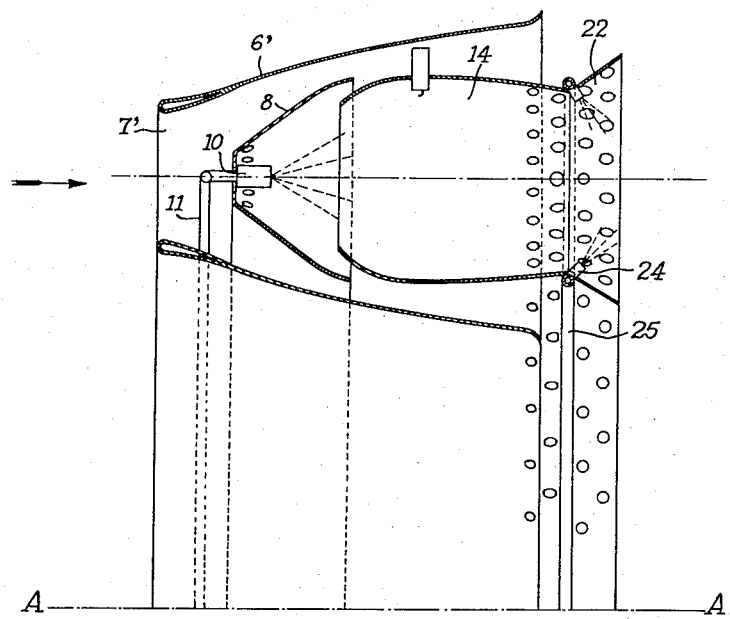
FIG. 6 is a sectional view of a combustion device according to the invention but of an annular type.
Figure 7:
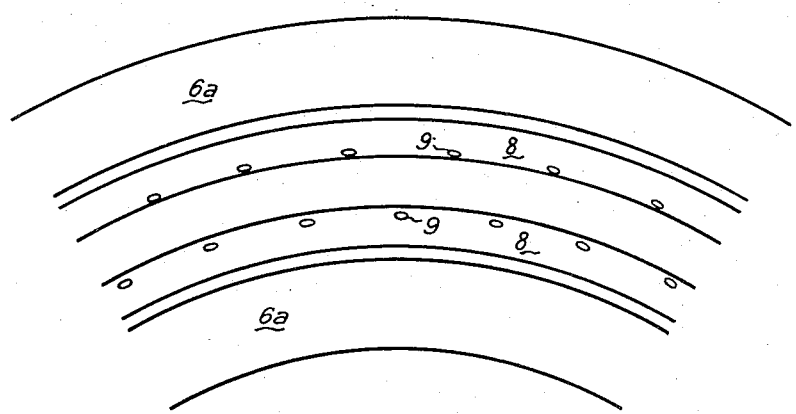
FIG. 7 is a partial elevational view of the device according to FIG. 6 as viewed in the direction of the arrow.

When the ram-jet engine is of large diameter, the device according to the invention can be of the annular type. This is what is shown in FIGS. 6 and 7, wherein the burner is in the form of a ring about the axis A—A of the ram-jet engine. The cross-section is identical to the form of embodiment of FIG. 4. The method of operation is the same as in the preceding case but the device can be used by itself, as a main burner, combustion being effected in a larger zone which depends on the diameter of the annular body.

Figure 8:
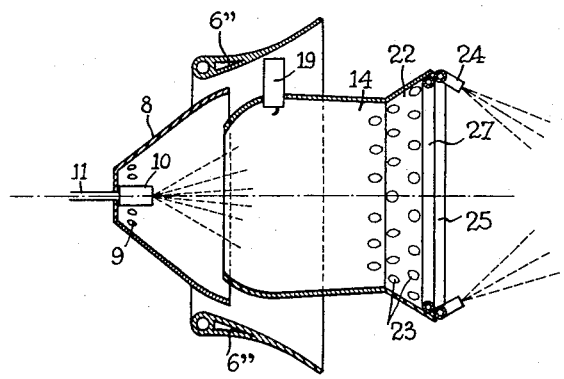
FIGS. 8 and 9 are sectional views of modified forms of the improved burner.
Figure 9:
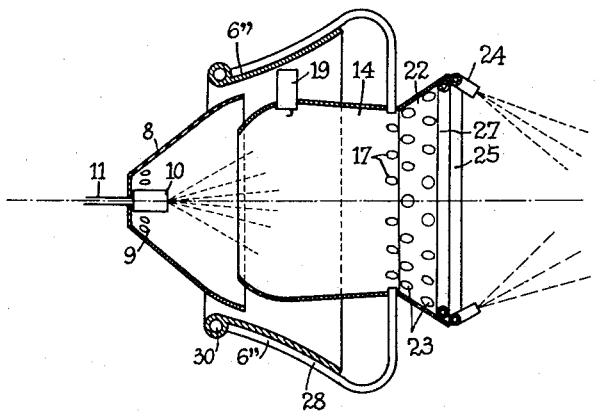

FIGS. 8 and 9 are variants of the form of embodiment illustrated in FIG. 4 and in which the outer wall 6" is shorter, without forming a convergent duct with the cone 8. Moreover the fuel is pre-heated before the downstream injection. For this purpose, the fuel circulates through an annular duct 27 before penetrating into the distributing pipe 25 which carries injectors 24 situated at the downstream edge of the conical outlet portion 22.

The variant shown in FIG. 9 also comprises tubes 28 which follow externally the wall 6" and which collects fresh air at 30 upstream of the throat 6c to introduce it into the chamber 14 through the orifices 17 situated at the downstream portion of the chamber 14. Thus there is brought about a greater supply of turbulent air to the chamber 14 and consequently an increase in the stability zone for rich total fuel/air ratios.

Figure 10:
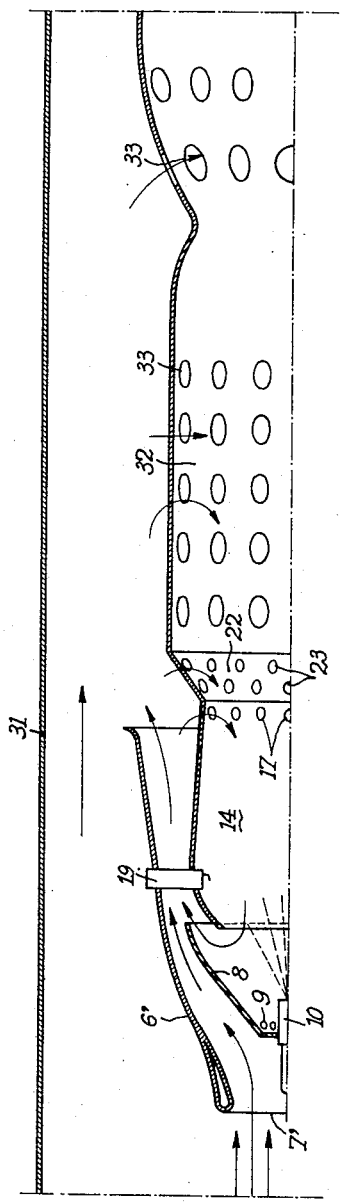
FIG. 10 is a longitudinal half-section of a combustion chamber of a turbo-jet engine whose burner is constituted by the device according to FIG. 4.

The devices of FIGS. 2, 4, 8, 9 can also be used as burners proper, for example in a turbo-jet engine. FIG. 10 shows in axial half-section a combustion chamber 31 of a turbo-jet engine with a burner whose constructional form is identical to that of FIG. 4 and to which is connected a flame tube 32 provided with orifices 33 for the admission of diluting secondary air. The mixture is then admitted to a turbine (not shown) situated downstream of the flame tube.

It will be apparent that modifications can be made to the constructional forms which have just been described and that it would be possible to use any equivalent technical means without departing from the scope of the present invention.

What is claimed is:

1. Combustion chamber traversed by a gaseous flow at high speed comprising a main burner; a combustion device including a cone member having an apex directed upstream with respect to said flow and a downstream edge, means for injecting fuel into said cone member, an elongated hollow body having an upstream end and a downstream end being opened at both ends and following said cone member at a distance therefrom and coaxial therewith so that said upstream end forms an annular slot with said downstream edge of said cone member, a concentric wall outside said body and forming therewith an annular divergent passage whereby said gaseous flow when entering said passage aspirates from said slot and produces within said body a flow from said downstream end towards the upstream end thereof; and extension pieces connecting said downstream end of said elongated body to said main burner, said pieces consisting of thin plates connected together along one edge to form an angle piece whose apex is directed upstream.

2. Combustion device for a combustion chamber traversed by a gaseous flow at high speed, comprising a cone member having an apex directed upstream with respect to said flow and a downstream edge, means for injecting fuel into said cone member, an elongated hollow body having an upstream end and a downstream end being opened at both ends and following said cone member at a distance therefrom and coaxial therewith so that said upstream end forms an annular slot with said downstream edge of said cone member, orifices formed in said elongated body near its downstream end, and a concentric wall outside said body and forming therewith an annular divergent passage whereby said gaseous flow when entering said passage aspirates from said slot and produces within said body a flow from said downstream end towards the upstream end thereof.

3. Combustion device according to claim 2 further comprising injectors situated at the downstream end of said body and directed obliquely downstream.

4. Combustion device according to claim 2 wherein said elongated body is a divergent-convergent body.

5. Combustion device for a combustion chamber traversed by a gaseous flow at high speed, comprising a cone member having an apex directed upstream with respect to said flow and a downstream edge, means for injecting fuel into said cone member, an elongated hollow body with a divergent portion followed by a convergent portion and having an upstream end and a downstream end being opened at both ends and following said cone member at a distance therefrom and coaxial therewith so that said upstream end forms an annular slot with said downstream edge of said cone member, and a concentric wall outside said body and forming an annular convergent passage both with said cone member and said divergent portion of said body and an annular divergent passage with said convergent portion of said body, said annular divergent passage being in register with said annular convergent passage through a throat situated substantially at the level of said slot, whereby said gaseous flow when entering said annular convergent passage aspirates from said slot and produces within said body a flow from said downstream end towards the upstream end thereof.

6. Combustion device according to claim 5 further comprising injectors situated at the downstream end of said body and directed obliquely downstream.

7. Combustion device according to claim 5 further comprising a substantially conical divergent wall perforated with orifices and prolonging the convergent portion of said divergent-convergent body.

8. Combustion device according to claim 7 further comprising downstream injection means which are situated at the downstream edge of said substantially conical divergent wall prolonging said divergent-convergent body and are directed obliquely downstream.

9. Combustion device according to claim 8 further comprising an annular duct fixedly secured to said conical divergent wall and supplying said downstream injection means whereby the fuel circulating therein is preheated before entering said downstream injection means.

10. Combustion device according to claim 2 comprising tubes collecting fresh air at the upstream side of said concentric wall and opening into said elongated body through some of said orifices provided near said downstream end of said elongated body.

11. Combustion device according to claim 2 wherein orifices are provided in said cone member in the vicinity of its apex.

12. Combustion device according to claim 5 further comprising means for displacing said cone member parallel to its axis in order to modify the opening of said annular slot.

References Cited in the file of this patent
UNITED STATES PATENTS

| | | |
|---|---|---|
| 2,387,708 | Arnhym | Oct. 30, 1945 |
| 2,679,137 | Probert | May 25, 1954 |
| 2,697,910 | Brzozowski | Dec. 28, 1954 |
| 2,907,171 | Lysholm | Oct. 6, 1959 |
| 2,941,362 | Bailey | June 21, 1960 |

FOREIGN PATENTS

| | | |
|---|---|---|
| 599,257 | Great Britain | Mar. 20, 1945 |
| 758,371 | Great Britain | Oct. 3, 1956 |